(12) United States Patent
Lin

(10) Patent No.: US 11,846,955 B2
(45) Date of Patent: Dec. 19, 2023

(54) COLD WATER DISCHARGE STRUCTURE

(71) Applicant: Hongxin Lin, Taizhou (CN)

(72) Inventor: Hongxin Lin, Taizhou (CN)

(73) Assignee: Zhejiang Huale Technology Co., Ltd., Taizhou (CN)

( * ) Notice: Subject to any disclaimer, the term of this patent is extended or adjusted under 35 U.S.C. 154(b) by 0 days.

(21) Appl. No.: 17/588,347

(22) Filed: Jan. 31, 2022

(65) Prior Publication Data

US 2023/0113764 A1    Apr. 13, 2023

(30) Foreign Application Priority Data

Oct. 13, 2021    (CN) .......................... 202111192033.7
Oct. 13, 2021    (CN) .......................... 202111193417.0

(51) Int. Cl.
*G05D 7/01*    (2006.01)
*E03C 1/04*    (2006.01)
*E03C 1/02*    (2006.01)

(52) U.S. Cl.
CPC .............. *G05D 7/01* (2013.01); *E03C 1/0408* (2013.01); *E03C 2001/026* (2013.01)

(58) Field of Classification Search
CPC ...... G05D 7/01; G05D 23/022; E03C 1/0408; E03C 2001/026; E03B 7/045; F24D 17/0078
See application file for complete search history.

(56) References Cited

U.S. PATENT DOCUMENTS

| | | | |
|---|---|---|---|
| 7,140,382 B2* | 11/2006 | Kempf ................ | F24D 17/0078 417/32 |
| 8,690,072 B2* | 4/2014 | Peric ........................ | F01P 7/14 236/93 R |
| 10,704,237 B2* | 7/2020 | Wu .......................... | E03B 7/045 |

FOREIGN PATENT DOCUMENTS

CN    105840908 B    3/2018

* cited by examiner

*Primary Examiner* — Michael R Reid
(74) *Attorney, Agent, or Firm* — Minder Law Group; Willy H. Wong

(57) ABSTRACT

The present invention provides a cold water discharge structure, which pertains to the technical field of shower equipment. It solves the problem of inconvenient use of existing cold water discharge device. The cold water discharge structure comprises a housing having an inlet and an outlet, a lateral part of the housing has a drainage hole capable of communicating with the inlet; a temperature sensing component is capable of moving under an elasticity effect of the elastic element to block communication between the inlet and the outlet and capable of communicating the inlet with the drainage hole; a temperature sensing component is capable of moving by overcoming an elasticity effect of the elastic element after sensing an increase in a medium temperature to block communication between the inlet and the drainage hole and capable of communicating the inlet with the outlet. The cold water discharge structure improves convenience of use.

10 Claims, 8 Drawing Sheets

COLD WATER DISCHARGE STRUCTURE

RELATED APPLICATIONS

This application claims priority to Chinese Patent Application No. CN202111193417.0 filed Oct. 13, 2021 and to Chinese Patent Application No. CN202111192033.7 filed Oct. 13, 2021.

The above applications and all patents, patent applications, articles, books, specifications, other publications, documents, and things referenced herein are hereby incorporated herein in their entirety for all purposes. To the extent of any inconsistency or conflict in the definition or use of a term between any of the incorporated publications, documents, or things and the text of the present document, the definition or use of the term in the present document shall prevail.

TECHNICAL FIELD

The present invention pertains to the technical field of shower equipment, particularly to a cold water discharge structure.

BACKGROUND

Shower equipment is a most commonly used bathing facilities in people's daily life, and as people's living standards are continuously improving, there are increasingly higher requirements for comfort and convenience in a showering process. For example, for showering in winter, most users have a water heater at home, however, because an existing shower equipment usually has a considerable amount of cold water remained in its pipeline to a water heater, a user before showering has to discharge residual cold water in the pipeline, and in the cold water discharge process, constantly manually test water temperature to determine whether output water temperature reaches a comfortable level, making the use of such shower equipment inconvenient. Furthermore, in the cold water discharge process, some users even might be drenched directly by cold water because of a wrong choice of a water outlet, therefore, such shower equipment is inconvenient and far from comfortable.

In view of the above, a control-and-switching valve device with cold water discharge function has been designed and filed for Chinese Patent Application No. 201510022883.0, Publication No. CN105840908B, and the control-and-switching valve device with cold water discharge function comprises: a valve body with a water inlet and a water outlet; a piston, which can be slidably connected in the valve body and slide in the X-direction; a sliding tube, which is, in X-direction, sealed and slidably connected in the valve body; a temperature sensing part and a back-pressure spring, in which the temperature sensing part can sense the temperature of water flowing through the valve body, to produce a deformation and thereby push against the piston to generate a pushing force to close an on-off passage; a handle mechanism, which is movably connected to the valve body and drive-connected to the sliding tube so that the sliding tube can be driven to slide by movement of the handle mechanism. When cold water passes through the above device, the on-off passage is turned open, so that cold water is directly discharged from the water outlet; after cold water is completely discharged, water temperature rises, the on-off passage is turned close, so that the water outlet stops discharging water, and then, pulling the handle mechanism makes the water outlet resume discharging hot water. However, the above control-and-switching valve device with cold water discharge function requires cooperation among the piston, the sliding tube, the handle mechanism, an eccentric pin, a deep groove, a shallow groove and other structures inside the valve device, therefore, it is relatively complex in its overall structure; moreover, when in use, cold water discharge before showering still flows out through the original water outlet, which means, when in showering, cold water would be discharged from a handheld showerhead or a top spray showerhead, so, there is still a possibility that a user would be directly drenched by cold water, and after completion of cold water discharge, the user needs to manually operate the handle mechanism again to allow hot water output, therefore, the above valve device is not convenient enough for use.

SUMMARY

Some objectives of one embodiment of the present invention are to provide a cold water discharge structure with respect to the above defects in the prior art, to solve the technical problem of how to improve convenience of use of a cold water discharge device.

The objectives of the present invention can be achieved by the following technical solution.

One embodiment of a cold water discharge structure comprises a housing having an inlet and an outlet, inside the housing are disposed with a temperature sensing component and an elastic element, a lateral part of the housing has a drainage hole capable of communicating with the inlet, the temperature sensing component is capable of moving under an elasticity effect of the elastic element to block communication between the inlet and the outlet and capable of communicating the inlet with the drainage hole, the temperature sensing component is also capable of moving by overcoming an elasticity effect of the elastic element after sensing an increase in a medium temperature in the housing to block communication between the inlet and the drainage hole and capable of communicating the inlet with the outlet again.

In one embodiment of the above cold water discharge structure, sealing is formed between an outer surface of the temperature sensing component and an inner wall surface of the housing through a ring-shaped first seal, a ring-shaped sealing part is further provided inside the housing, an opening position of the drainage hole is located between the first seal and the sealing part, and the temperature sensing component is capable of abutting on the sealing part after sensing an increase in a medium temperature in the housing to block communication between the inlet and the drainage hole.

In one embodiment of the above cold water discharge structure, the temperature sensing component comprises a temperature sensing element and a switch that is cylindrical and sleeved on an outer side of the temperature sensing element, the switch is fixed with the temperature sensing element, the first seal is disposed between an outer surface of a first end of the switch facing the outlet and the inner wall surface of the housing, and a second end of the switch facing the inlet being driven by the temperature sensing element is capable of approaching and abutting on the sealing part to form a seal.

In one embodiment of the above cold water discharge structure, a position-limiting seat is provided in the housing and at a position near the outlet, a pass-through provided for a medium to pass through is formed between an outer surface of the position-limiting seat and the inner wall surface of the housing, and the switch is capable of approaching the position-limiting seat under an elasticity effect of the elastic element and capable of forming a seal with the position-limiting seat.

Compared to the prior art, the present cold water discharge structure has the following advantages:

1. With cooperation between the temperature sensing element and the elastic element, automatic diversion control of the drainage hole and the outlet can be realized, without the need of manual operation, making it more convenient to use.

2. The drainage hole used for drainage of cold water is disposed separately at a lateral part of the housing, ensuring that cold water will not flow out from the outlet and thus preventing a user from being drenched with cold water; moreover, after completion of drainage of cold water, hot water will flow out from the outlet to a shower equipment, making it more intuitive to determine whether hot water is ready, and therefore more convenient to use.

DETAILED DESCRIPTION

Set forth below are specific embodiments of the present invention and a further description of the technical solutions of the present invention in conjunction with the accompanying drawings, but the present invention is not limited to these embodiments.

Embodiment I

Figure 1:
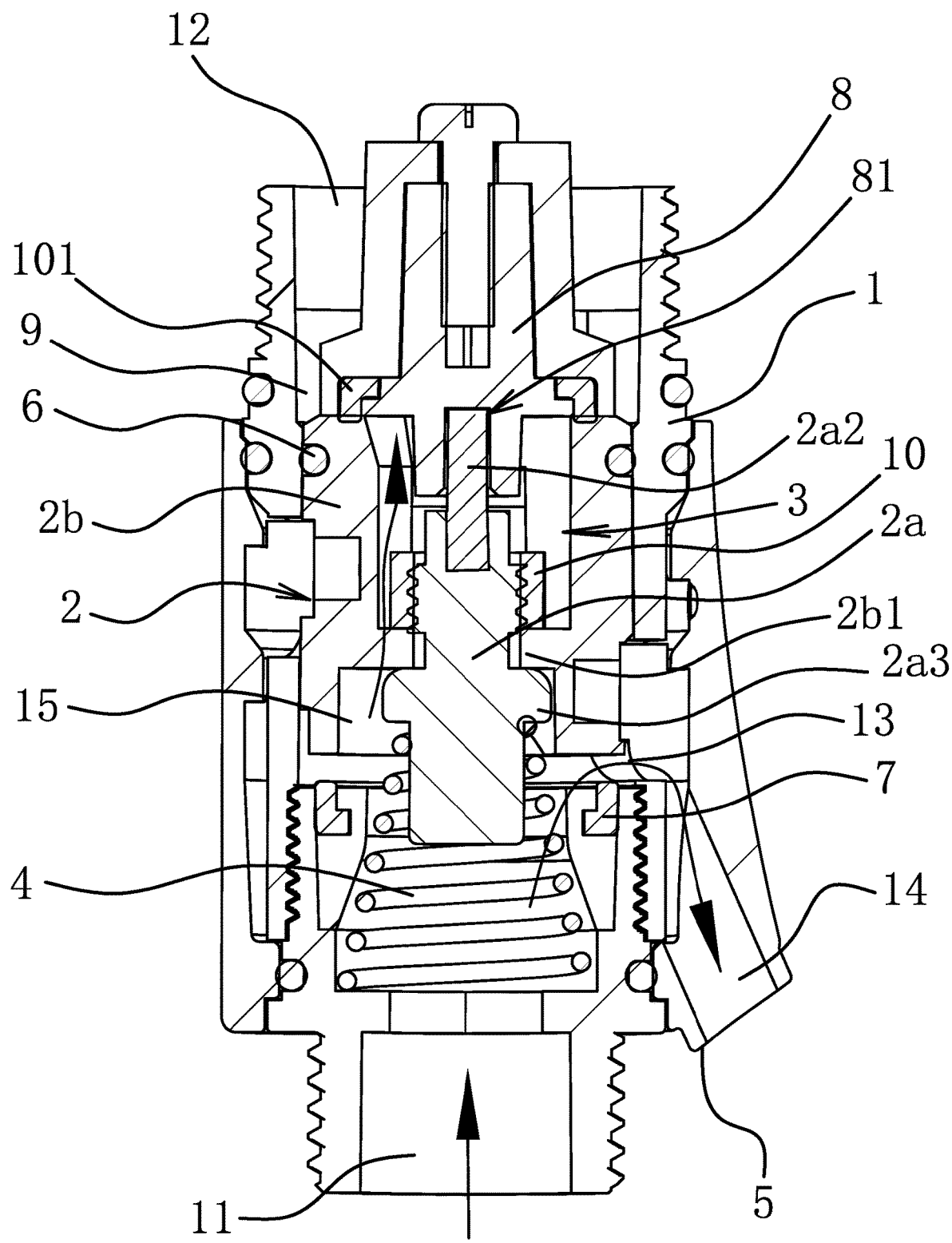
FIG. 1 is a cross-sectional view of a cold water discharge structure when discharging cold water in accordance with Embodiment I of the present invention.
Figure 2:
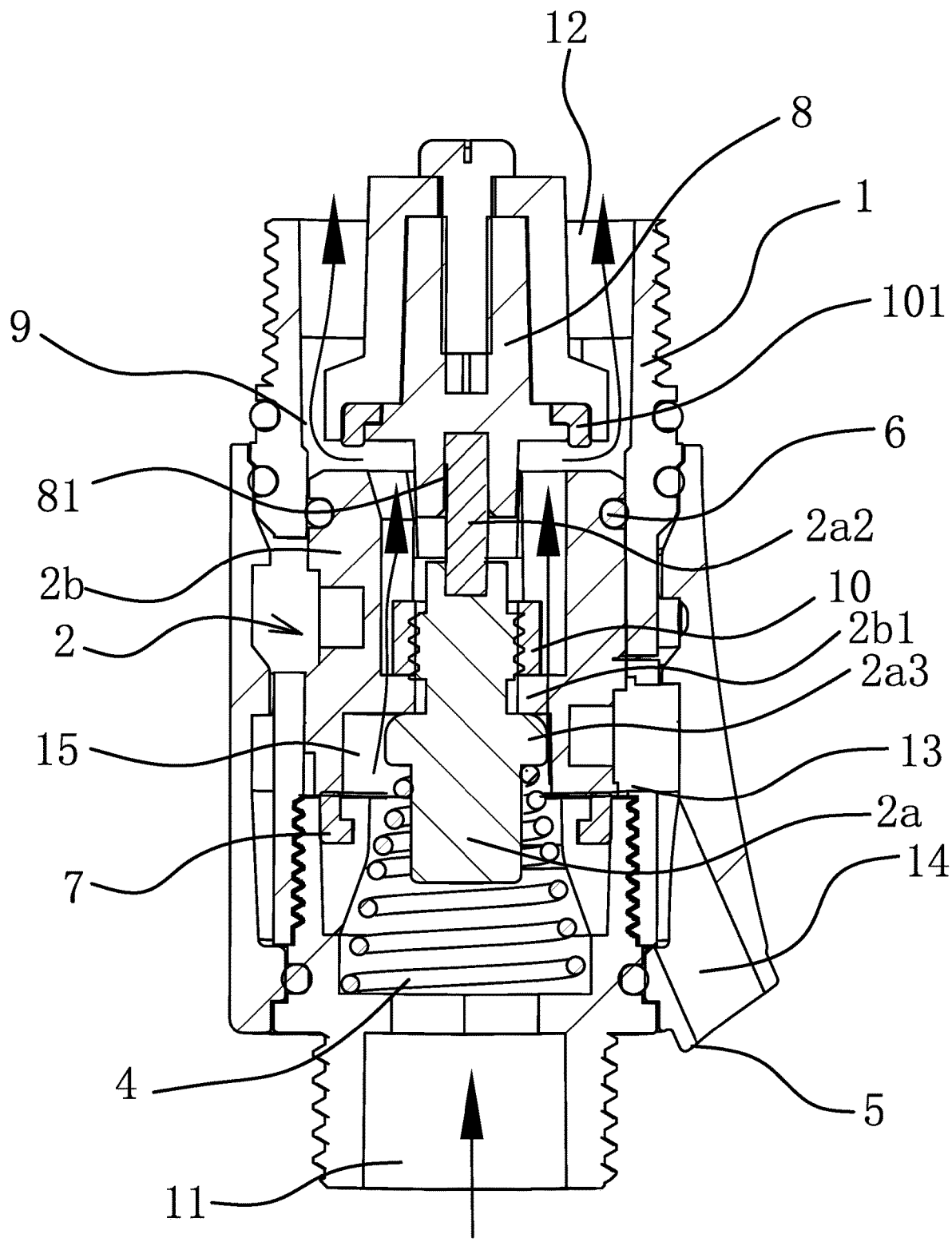
FIG. 2 is a cross-sectional view of a cold water discharge structure when outputting hot water in accordance with Embodiment I of the present invention.

As shown in FIGS. 1 and 2, one embodiment of a cold water discharge structure of the present invention comprises a cylindrical housing 1 having an inlet 11 and an outlet 12 at two ends of the housing 1 respectively and a passage 15 disposed inside the housing 1 and communicating with both the inlet 11 and the outlet 12. A lateral part of the housing 1 has a drainage hole 13 capable of communicating with the passage 15, the housing 1 also has a drainage passage 14 separate from the passage 15, the drainage hole 13 is always communicated with the outside of the housing 1 through the drainage passage 14, an exit portion of the drainage passage 14 has a discharge part 5 for piping connections. In this embodiment, the drainage passage 14 is disposed at an angle with respect to an axis of the housing 1, an outlet end of the drainage passage 14 is closer to the inlet 11 than the inlet end of the drainage passage 14 is to the inlet 11. After installation of the housing 1, the inlet 11 will often be located at a lower part of the housing 1, therefore, disposing the drainage passage 14 at an angle to the direction of the inlet 11 is more conducive to discharge of cold water and connection of a drainage pipeline.

Inside the housing 1, along the direction from the outlet 12 to the inlet 11, there are provided sequentially a position-limiting seat 8 fixed to the housing 1, a movable temperature sensing component 2, an elastic element 4 acting on the temperature sensing component 2, and a sealing part 7. The temperature sensing component 2 comprises a fixedly connected temperature sensing element 2a and a switch 2b, the temperature sensing element 2a has a protruding rod-shaped actuator 2a2, the switch 2b is cylindrical and disposed coaxially with the housing 1, and the temperature sensing element 2a is inserted into the switch 2b. A first end of the temperature sensing element 2a abuts on the position-limiting seat 8, and the elastic element 4 acts on a second end of the temperature sensing element 2a. In this embodiment, the passage 15 comprises: a pass-through 9 used for water to flow through and formed between an outer surface of the position-limiting seat 8 and an inner wall surface of the housing 1, and a water gap 3 used for water to flow through and formed between an inner surface of the switch 2b and the temperature sensing element 2a. An end of the position-limiting seat 8 facing the switch 2b is provided with a ring-shaped second seal 101, therefore, when the switch 2b is moved towards the outlet 12 under an elasticity effect of the elastic element 4, a first end of the switch 2b near the outlet 12 can abut on the second seal 101 and make sealing formed between the switch 2b and the position-limiting seat 8. Meanwhile, an outer surface of the first end of the switch 2b near the outlet 12 is provided with a fixed ring-shaped first seal 6 which makes sealing formed between the outer surface of the switch 2b and the inner wall surface of the housing 1, hence, when the switch 2b, under an elasticity effect of the elastic element 4, abuts on the second seal 101, an sealing effect of both the first seal 6 and the second seal 101 makes the pass-through 9 of the passage 15 blocked, and therefore the inlet 11 is blocked from communicating with the outlet 12.

An end of the position-limiting seat 8 facing the inlet 11 has a recessed position-limiting hole 81, an end portion of the actuator 2a2 is inserted into the position-limiting hole 81, and the end portion of the actuator 2a2 is capable of abutting on a bottom of the position-limiting hole 81 under an elasticity effect of the elastic element 4. An outer surface of the second end of the temperature sensing element 2a near the inlet 11 has a protruding ring-shaped position-limiting shoulder 2a3, an outer surface of the first end of the temperature sensing element 2a near the outlet 12 is threadedly connected with an annular position-limiting ring 10, an inner wall surface of the switch 2b has a protruding ring-shaped convex ring 2b1, and the convex ring 2b1 is extended between the position-limiting ring 10 and the position-limiting shoulder 2a3, and when the position-limiting ring 10 is screwed in along threads, it can press the convex ring 2b1 tightly against the position-limiting shoulder 2a3 so that the switch 2b is fixed to the temperature sensing element 2a. When the temperature sensing element 2a senses that temperature of a medium in the passage 15 rises to a set value, the actuator 2a2 of the temperature sensing element 2a is pushed out, and since the position-limiting seat 8 is fixed in the housing 1, the temperature sensing element 2a brings the switch 2b to move together in a direction towards the sealing part 7 until the second end of the switch 2b near the inlet 11 abuts on the sealing part 7 and forms a seal, and now, as the drainage hole 13 disposed along the axial direction of the housing 1 is located between the sealing part 7 and the first seal 6, sealing formed between the first seal 6 and the sealing part 7 thus can block the drainage hole 13. In this embodiment, the elastic element 4 is a tower spring or a compression spring, with its two ends abutting on the housing 1 and the temperature sensing element 2a respectively; the temperature sensing element 2a can be selected from a paraffin temperature sensing bulb or an SMA temperature sensing bulb; the sealing part 7 comprises a ring-shaped sealing seat fixed to the housing 1 and a ring-shaped seal fixed on the sealing seat, with the tower spring or the compression spring being inserted in the sealing seat.

This cold water discharge structure can be used in a water outlet mechanism (such as a handheld showerhead, a top spray showerhead, etc.) in a shower equipment, and specifically can be used as a joint fitting structure by way of connecting a threaded connection structure at both ends of the housing 1 to a water-supply pipeline or to an inlet end of a handheld showerhead or a top spray showerhead. Meanwhile, the discharge part 5 of the drainage passage 14 can be piped directly to a floor drain for drainage of water or connected to a cold water pipe for reuse of water.

As shown in FIG. 1, when the shower equipment is not used for a certain period of time, temperature of the water remaining in the water-supply pipeline will gradually decrease. Once the temperature sensing element 2a in the housing 1 senses a decrease in temperature, the actuator 2a2 retracts, causing the temperature sensing element 2a and the switch 2b to move in the direction toward the outlet 12 under an elasticity effect of the elastic element 4, so that the first end of the switch 2b near the outlet 12 abuts on the second seal 101 of the position-limiting seat 8, blocking the pass-through 9 of the passage 15, therefore, the inlet 11 is blocked from communicating with the outlet 12. At this point, as an axial distance between the position-limiting seat 8 and the sealing part 7 is greater than an axial length of the switch 2b, the second end of the switch 2b near the inlet 11 detaches from the sealing part 7, hence, a spacing between the switch 2b and the sealing part 7 allows the inlet 11 to be communicated with the drainage hole 13.

When the shower equipment is turned back on for use, cold water in the water-supply pipeline will be firstly fed into the housing 1 through the inlet 11, and then discharged through the drainage hole 13, the drainage passage 14 and the discharge part 5 sequentially.

As shown in FIG. 2, when cold water is completely discharged, hot water from a water heater enters the housing 1, and once the temperature sensing element 2a senses a rapid increase in a medium temperature, the actuator 2a2 pushes out, driving the switch 2b to overcome an elasticity effect of the elastic element 4 to move in the direction toward the inlet 11, so that the second end of the switch 2b near the inlet 11 abuts on the sealing part 7, blocking the drainage hole 13, meanwhile, the first end of the switch 2b near the outlet 12 detaches from the position-limiting seat 8 and opens the pass-through 9, so that the inlet 11 becomes communicated with the outlet 12 via the passage 15, hence, cold water stops being discharged from the drainage hole 13 and hot water starts being output from the outlet 12 and consequently flows out through a handheld showerhead or a top spray showerhead.

In the process of reuse of the shower equipment, with cooperation of the temperature sensing component 2 and the elastic element 4, the cold water discharge structure can, based on a temperature change of the water flowing into the housing 1, realize automatic waterway switching between the drainage hole 13 and the outlet 12 which are used for cold water discharge and hot water output respectively, thus eliminating the need for manual operation and making it more convenient to use. Moreover, the cold water discharge path communicated through the drainage hole 13 disposed at a lateral part of the housing 1 is provided separately with respect to the hot water output path communicated through the outlet 12, therefore, in actual use, cold water will not be discharged from a handheld showerhead or an outlet panel of a top spray showerhead, effectively preventing a user from being drenched in cold water upon turning on the shower equipment, meanwhile, once the user sees water flowing out of a handheld showerhead or a top spray showerhead, it is hot water that starts being output, making the use of the shower equipment more intuitive and convenient.

Embodiment II

Figure 3:
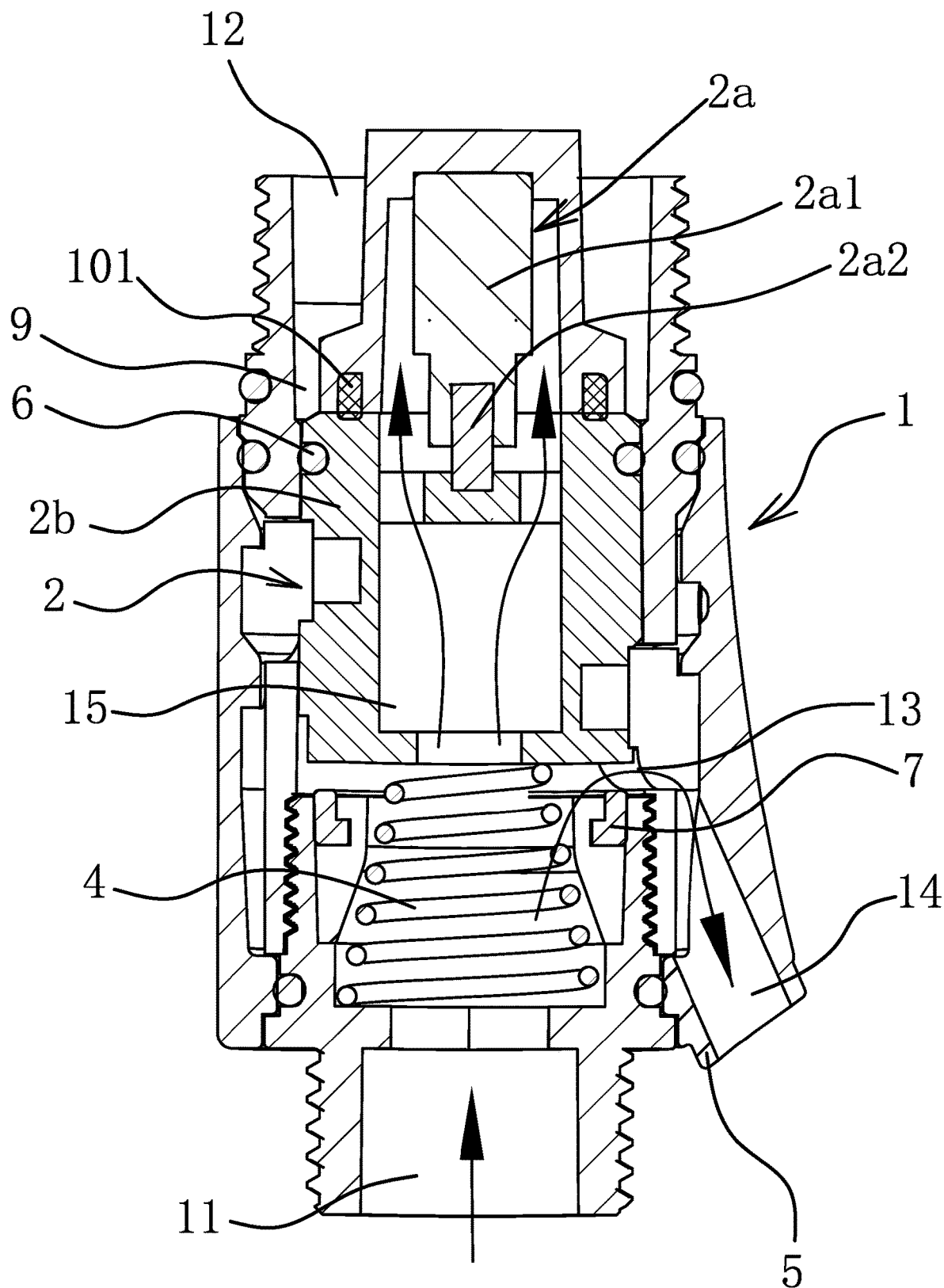
FIG. 3 is a cross-sectional view of a cold water discharge structure when discharging cold water in accordance with Embodiment II of the present invention.
Figure 4:
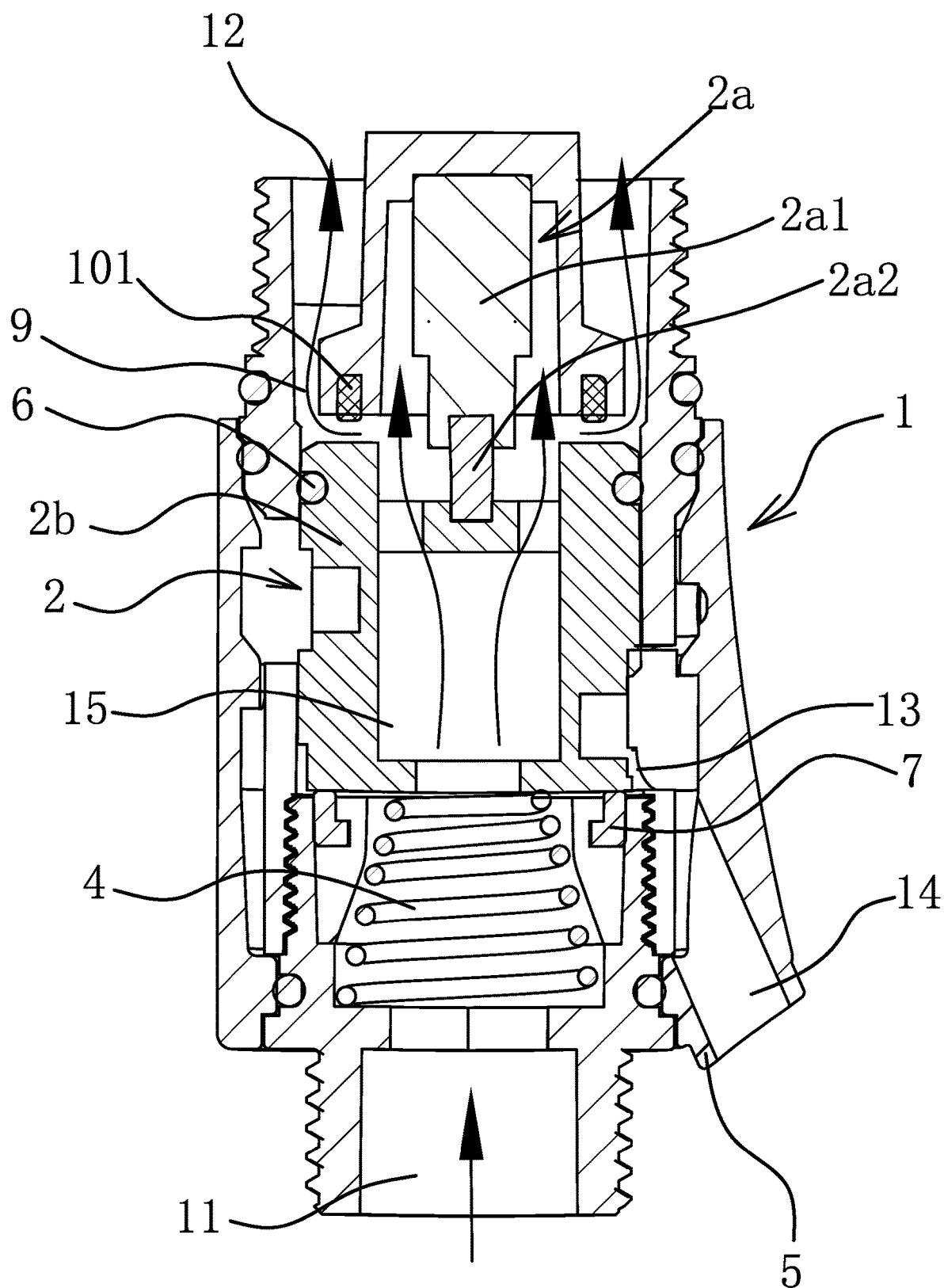
FIG. 4 is a cross-sectional view of a cold water discharge structure when outputting hot water in accordance with Embodiment II of the present invention.

As shown in FIGS. 3 and 4, this embodiment differs from Embodiment I in that: the temperature sensing element 2a is inverted and comprises a body 2a1 and a rod-shaped actuator 2a2 located at an end of the body 2a1, the body 2a1 is fixed to the housing 1, the actuator 2a2 is oriented toward the inlet 11 and abuts on a first end of the switch 2b, and the elastic element 4 abuts on a second end of the switch 2b. Although disposing the temperature sensing element 2a outside the switch 2b will increase the volume of the entire structure, it allows to increase sizes of internal pores to assure a sufficient through-put of water, which can specifically be applied according to different use circumstances.

Embodiment III

Figure 5:
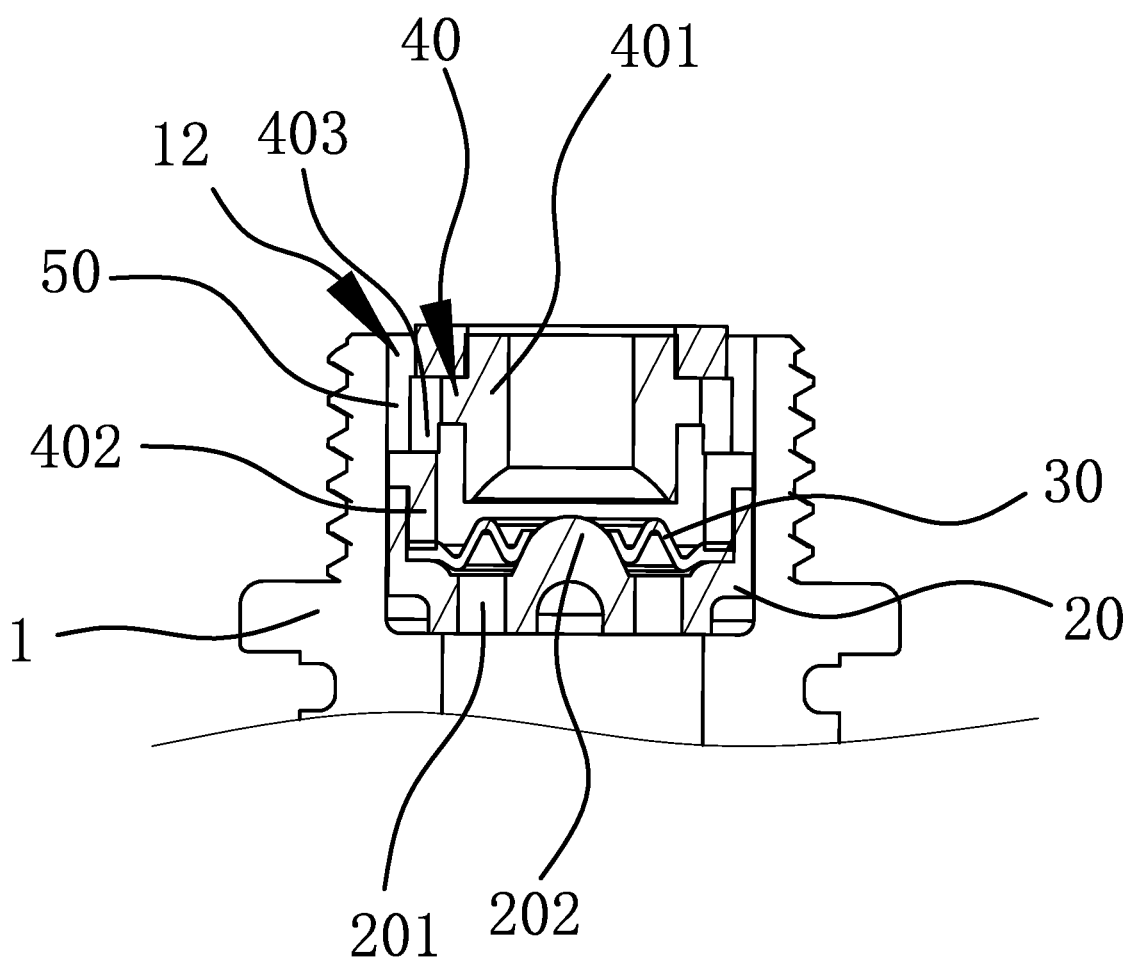
FIG. 5 is a cross-sectional view of an outlet in accordance with Embodiment III of the present invention.

As shown in FIG. 5, this embodiment differs from Embodiment I in that: an axial length of the outlet 12 of the housing 1 is longer, an outlet seat 20 and an annular drain seat 40 are further fixed in the outlet 12 of the housing 1, and compared to the outlet seat 20, the drain seat 40 is closer to a port of the outlet 12 of the housing 1. An outer portion of the outlet seat 20 abuts and seals with an inner wall of the housing 1, a plurality of outlet holes 201 penetrate through the outlet seat 20, a middle portion of one end of the outlet seat 20 near the drain seat 40 has a protruding protrusion 202, an outer surface of the protrusion 202 is curved, between the outlet seat 20 and the drain seat 40 is further provided with a ring-shaped deformable diaphragm 30 capable of covering all the outlet holes 201, an outer edge of the deformable diaphragm 30 is pressed tightly between the outlet seat 20 and the drain seat 40, an inner edge of the deformable diaphragm 30 abuts against the outer surface of the protrusion 202 and forms a seal. The drain seat 40 comprises an inner cylinder 401 and an outer cylinder 402 that are integrally connected and are both cylindrical, the outer cylinder 402 is sleeved on an outer side of the inner cylinder 401, the outer edge of the deformable diaphragm 30 is tightly pressed between an end portion of the outer cylinder 402 and the outlet seat 20, a gap 50 is provided between an outer surface of an end of the outer cylinder 402 away from the deformable diaphragm 30 and the inner wall surface of the housing 1, the gap 50 communicates to reach a port of the outlet 12 of the housing 1, a drain hole 403 penetrates through a side wall of the outer cylinder 402 and is capable of communicating an inner cavity of the outer cylinder 402 with the gap 50, an end of the inner cylinder 401 facing the deformable diaphragm 30 is closer to the deformable diaphragm 30 than the drain hole 403 is to the deformable diaphragm 30, the deformable diaphragm 30 is capable of deforming and detaching from the protrusion 202 under an effect of water pressure at the outlet holes 201 and abutting on an end of the inner cylinder 401.

During normal discharge of water at the outlet 12, the deformable diaphragm 30 is deformed under an effect of water pressure in the housing 1, the inner edge of the deformable diaphragm 30 detaches from the protrusion 202 and abuts against an end of inner cylinder 401, so that outflowing water flows directly into the inner cylinder 401, instead of flowing into a space between the inner cylinder 401 and the outer cylinder 402; conversely, after normal discharge of water is halted, the deformable diaphragm 30 is restored to its original position, and the water remaining in a water-using equipment communicated with the outlet 12 of the housing 1 will flow back under its own gravity, since the restored deformable diaphragm 30 blocks and seals the outlet holes 201, the remaining water will flow into the space between the inner cylinder 401 and the outer cylinder 402, and then through the drain hole 403 to the port of the outlet 12 of the housing 1, and finally to outside from a slit where the housing 1 and the water-using equipment are connected, thus achieving the function of residual water discharge.

Embodiment IV

Figure 6:
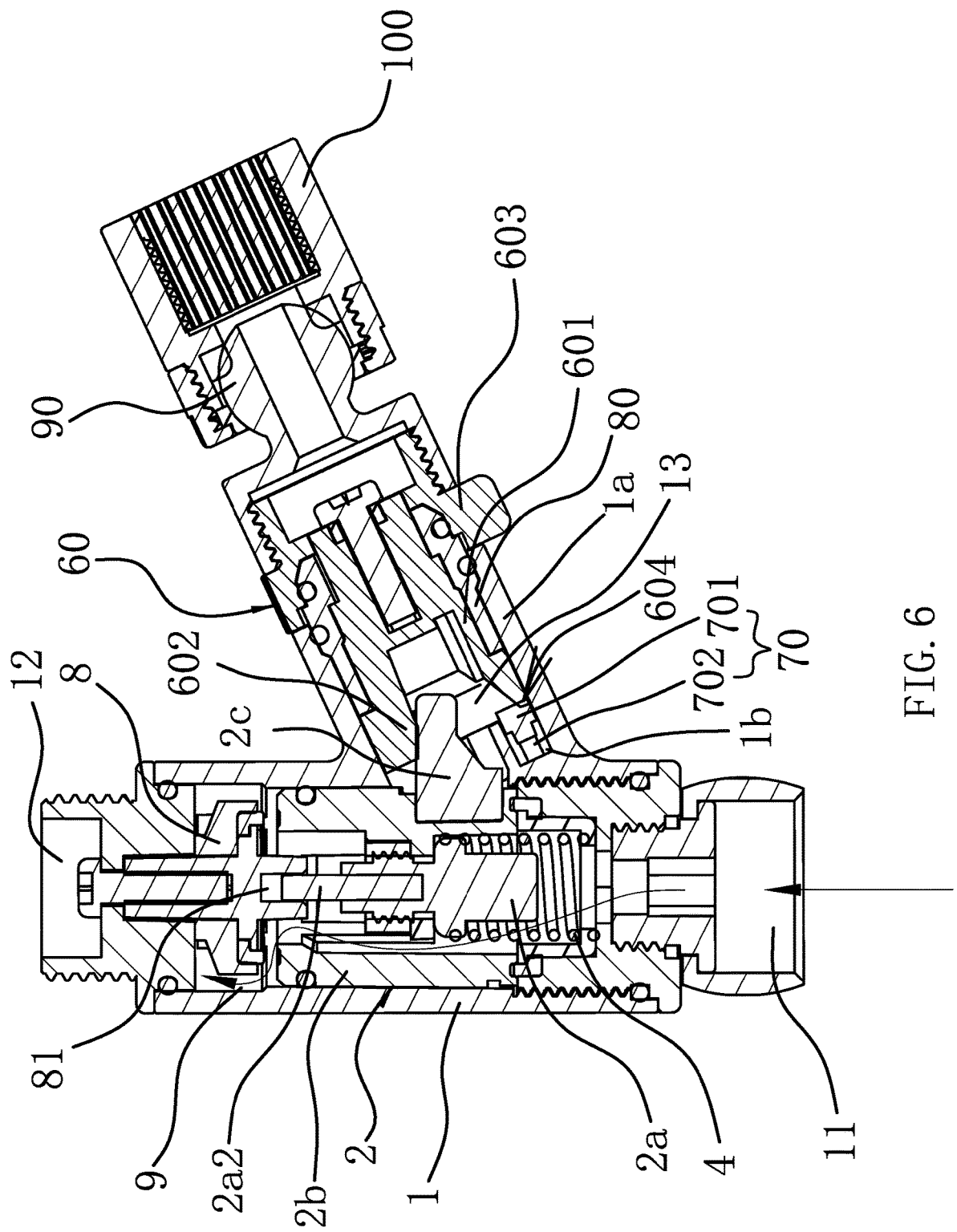
FIG. 6 is a cross-sectional view of a cold water discharge structure with the cold water discharge function switched off in accordance with Embodiment IV of the present invention.
Figure 7:
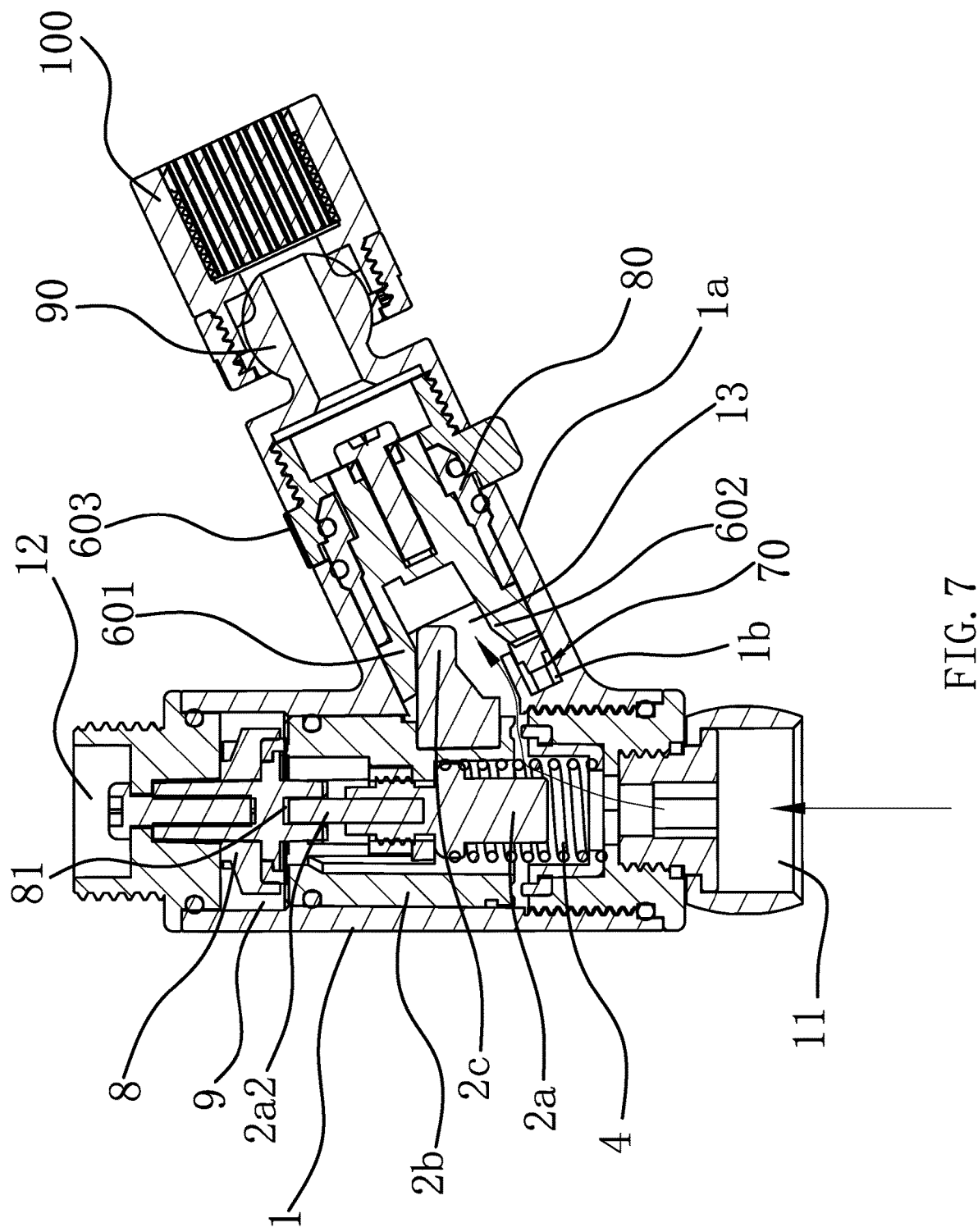
FIG. 7 is a cross-sectional view of a cold water discharge structure with the cold water discharge function switched on in accordance with Embodiment IV of the present invention.
Figure 8:
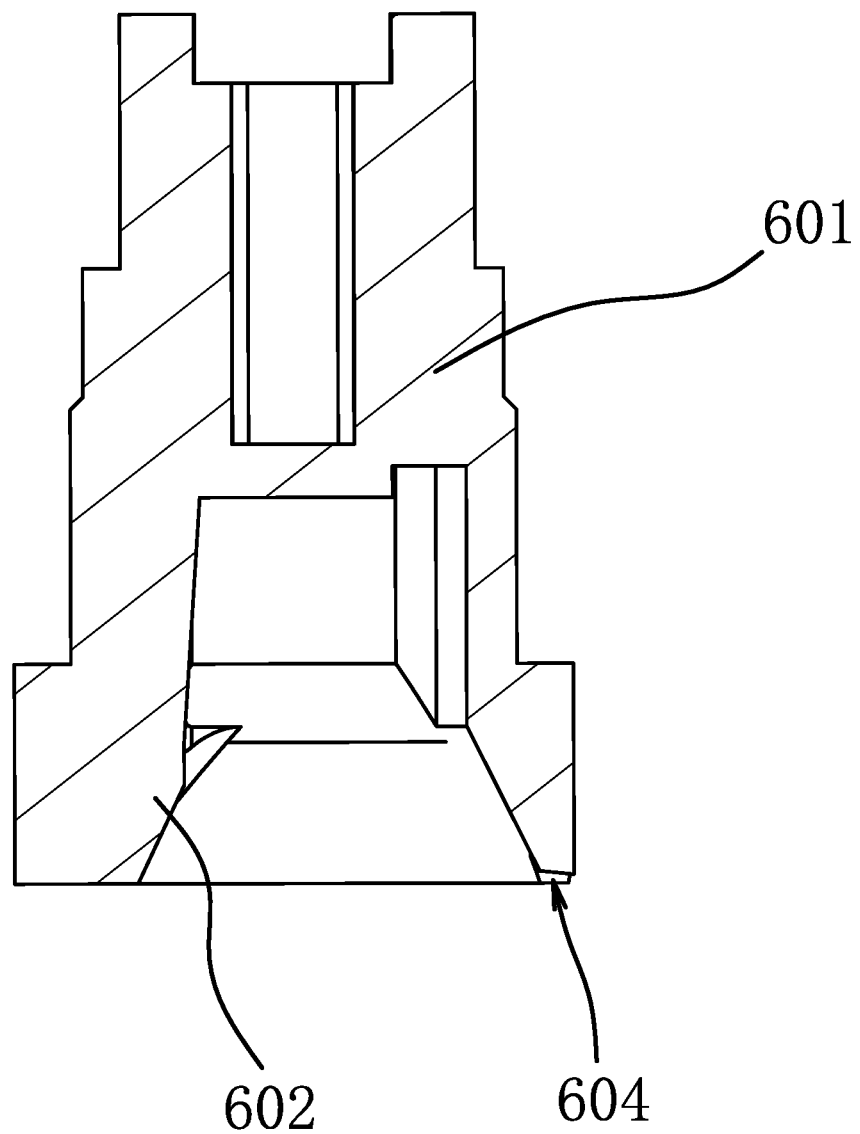
FIG. 8 is a cross-sectional view of a rotating part in accordance with Embodiment IV of the present invention.

As shown in FIGS. 6-8, based on the structure of Embodiment I, at the lateral part of the housing 1 is further disposed a protruding cylinder-shaped drainage part 1a with a drainage hole 13, on the drainage part 1a is also attached an operating member 60, an inner end of the operating member 60 extends into the housing 1 and is capable of acting on the temperature sensing component 2, that is, the operating member 60 is capable of rotating circumferentially around the drainage hole 13 to drive the temperature sensing component 2 to move, so as to block communication between the drainage hole 13 and the inlet 11. The temperature sensing component 2 further comprise an abutting part 2c fixed to an exterior of the switch 2b, the abutting part 2c is disposed corresponding to the position of the drainage hole 13 and extends into the drainage hole 13.

The operating member 60 comprises a ring-shaped rotating part 601 located at the inner end of the operating member 60 and a ring-shaped operating part 603 located at an outer end of the operating member 60 and the operating part 603 being attached to the drainage part 1a, with an outer portion of the operating part 603 protruding from the housing 1. In order to facilitate operation, a flattened lug may be supplementally provided to the outer portion of the operating part 603 for operation. The rotating part 601 has a bulging protruding part 602 provided on the inner wall at one end of the rotating part 601 near the abutting part 2c, with a transition surface from the protruding part 602 to the rest non-bulged inner wall on both sides of the protruding part 602 of the rotating part 601 being a sloped surface or a curved surface, and both the rotating part 601 and the operating part 603 rotate together circumferentially around their common axis when the operating member 60 rotates circumferentially around the drainage hole 13. The abutting part 2c extends into the rotating part 601 and is capable of abutting against the local inner wall of the rotating part 601 near the outlet 12 under an elasticity effect of the elastic element 4.

At a position on the housing 1 corresponding to the operating member 60, there is further provided a positioning member 70 which is capable of limiting a circumferential position of the operating member 60 as the operating member 60 drives the temperature sensing component 2 to block communication between the inlet 11 and the drainage hole 13. The positioning member 70 comprises a positioning pin 701 and an elastic positioning element 702 which are both located in a recessed hole 1b, the recessed hole 1b being disposed in the housing 1 and oppositely corresponding to a recessed positioning hole 604 disposed at one end of the rotating part 601, so that when the operating member 60 is rotated circumferentially, the positioning pin 701 is capable of partially extending into the positioning hole 604, under an elasticity effect of the elastic positioning element 702, to achieve circumferential positioning of the operating member 60, wherein the elastic positioning element 702 may be a spring; the rotating part 601 and the operating part 603 on the operating member 60 are two parts of a split structure, each of the two parts having a connecting portion on its inner side, and each of the two connecting portions being connected through a connecting rod to the rotating part 601 and the operating part 603 respectively, making a water access port formed on respective outer sides of the connecting portions, furthermore, the rotating part 601 and the operating part 603 are fixed to each other by a fastener inserted through the two connecting portions.

In order to reduce wear, between the rotating part 601 and the inner wall of the housing 1, there is further provided a cylindrical sealed cylinder 80 sleeved on an outer side of the rotating part 601, with sealing being formed between an outer side of the sealed cylinder 80 and the inner wall of the drainage part 1a and between the outer side of the sealed cylinder 80 and the inner side of the operating part 603, by means of a sealing ring respectively; furthermore, the sealed cylinder 80 is axially fixed to the drainage part 1a, and the operating member 60 can be rotated circumferentially relative to the sealed cylinder 80. The inner wall of the drainage part 1a is provided with a recessed arc-shaped limiting groove around its own axis, and the outer side of the sealed cylinder 80 has a limiting protruding portion that extends into the limiting groove.

In order to facilitate cold water discharge and provide additional water output functions, at an water outlet of the drainage hole 13, there may be attached a universal joint 90 and a bubbler 100 that can rotate in a universal direction with respect to the housing 1.

In summer season and other periods when cold water is needed, a user can manually rotate the operating member 60 extending out of the housing 1, to cause the rotating part 601 of the operating member 60 to rotate circumferentially, and in this process, the abutting part 2c initially keeps abutting against the inner wall of one side of the rotating part 601 near the outlet 12, under an elasticity effect of the elastic element 4, until the abutting part 2c moves along the transition surface to the protruding part 602, at this point, the abutting part 2c starts driving the switch 2b to overcome the elasticity effect of the elastic element 4 to move in the direction toward the inlet 11, thus blocking the drainage hole 13, meanwhile, the positioning pin 701 partially extends into the positioning hole 604 disposed at one end of the rotating part 601, under an elasticity effect of the elastic positioning element 702, thus achieving circumferential positioning of the operating member 60; in this way, the cold water discharge function is closed, and cold water can be directly output from the outlet 12.

REFERENCED PARTS

1 housing
11 inlet
12 outlet
13 drainage hole
14 drainage passage
15 passage
1a drainage part
1b recessed hole
2 temperature sensing component
2a temperature sensing element
2a1 body
2a2 actuator
2a3 position-limiting shoulder
2b switch
2b1 convex ring
2c abutting part
3 water gap
4 elastic element
5 discharge part
6 first seal
7 sealing part
8 position-limiting seat
81 position-limiting hole
9 pass-through
10 position-limiting ring
101 second seal
20 outlet seat
201 outlet hole
202 protrusion
30 deformable diaphragm
40 drain seat
401 inner cylinder
402 outer cylinder
403 drain hole
50 gap
60 operating member
601 rotating part
602 protruding part
603 operating part
604 positioning hole
70 positioning member
701 positioning pin
702 elastic positioning element
80 sealed cylinder
90 universal joint
100 bubbler
TTL cold water discharge structure

The invention claimed is:

1. A cold water discharge structure comprising a housing having an inlet and an outlet, inside the housing being disposed with a temperature sensing component, which forms a seal with an inner wall surface of the housing, and an elastic element, a lateral part of the housing having a drainage hole capable of communicating with the inlet, the temperature sensing component being capable of moving under an elasticity effect of the elastic element to block communication between the inlet and the outlet and capable of communicating the inlet with the drainage hole, the temperature sensing component being capable of moving by overcoming an elasticity effect of the elastic element after sensing an increase in a medium temperature in the housing to block communication between the inlet and the drainage hole and capable of communicating the inlet with the outlet again;

wherein sealing is formed between an outer surface of the temperature sensing component and the inner wall surface of the housing through a ring-shaped first seal, a ring-shaped sealing part is further provided inside the housing, an opening position of the drainage hole is located between the first seal and the sealing part, and the temperature sensing component is capable of abutting on the sealing part after sensing an increase in a medium temperature in the housing to block communication between the inlet and the drainage hole.

2. The cold water discharge structure as claimed in claim 1, wherein the housing is cylindrical, and the inlet and the outlet are respectively located at two ends of the housing.

3. The cold water discharge structure as claimed in claim 1, wherein the temperature sensing component comprises a temperature sensing element and a switch that is cylindrical and sleeved on an outer side of the temperature sensing element, the switch is fixed with the temperature sensing element, the first seal is disposed between an outer surface of a first end of the switch facing the outlet and the inner wall surface of the housing, and a second end of the switch facing the inlet being driven by the temperature sensing element is capable of approaching and abutting on the sealing part to form a seal.

4. The cold water discharge structure as claimed in claim 3, wherein a position-limiting seat is provided in the housing and at a position near the outlet, a pass-through provided for a medium to pass through is formed between an outer surface of the position-limiting seat and the inner wall surface of the housing, and the switch is capable of approaching the position-limiting seat under an elasticity effect of the elastic element and capable of forming a seal with the position-limiting seat.

5. The cold water discharge structure as claimed in claim 4, wherein an end of the position-limiting seat facing the inlet has a recessed position-limiting hole, the temperature sensing element has a protruding rod-shaped actuator, the actuator is inserted into the position-limiting hole, and an end portion of the actuator is capable of abutting on a bottom of the position-limiting hole under an elasticity effect of the elastic element.

6. The cold water discharge structure as claimed in claim 3, wherein an outer surface of a second end of the temperature sensing element near the inlet has a protruding position-limiting shoulder, an outer surface of a first end of the temperature sensing element near the outlet is threadedly connected with a position-limiting ring, an inner wall surface of the switch has a protruding ring-shaped convex ring, and the convex ring is embedded and fixed between the position-limiting ring and the position-limiting shoulder.

7. The cold water discharge structure as claimed in claim 3, wherein the temperature sensing element comprises a paraffin temperature sensing bulb or an SMA temperature sensing bulb.

8. The cold water discharge structure as claimed in claim 1, wherein the temperature sensing component comprises a temperature sensing element and a cylindrical switch, the first seal is disposed between an outer surface of the switch and the inner wall surface of the housing, the temperature sensing element comprises a body and a rod-shaped actuator located at an end of the body, the body is fixed to the housing, the actuator abuts on a first end of the switch, the elastic element abuts on a second end of the switch, and the second end of the switch being driven by the temperature sensing element is capable of approaching and abutting on the sealing part to form a seal.

9. The cold water discharge structure as claimed in claim 1, wherein an outlet seat is fixed in the outlet of the housing, an outer portion of the outlet seat abuts and seals with an inner wall of the housing, a plurality of outlet holes penetrates through the outlet seat, a middle portion of an outlet end of the outlet seat has a protruding protrusion, the outlet end of the outlet seat is further provided with a ring-shaped deformable diaphragm capable of covering all the outlet holes, an outer edge of the deformable diaphragm is fixed with the outlet seat, an inner edge of the deformable diaphragm abuts on the protrusion and forms a seal, and the deformable diaphragm is capable of deforming and detaching from the protrusion under an effect of water pressure at the outlet holes.

10. The cold water discharge structure as claimed in claim 9, wherein a ring-shaped drain seat is further fixed in the housing, the drain seat comprises an inner cylinder and an outer cylinder that are integrally connected and are both cylindrical, the outer cylinder is sleeved on an outer side of the inner cylinder, the outer edge of the deformable diaphragm is tightly pressed between the outer cylinder and the outlet seat, a gap is provided between an outer surface of an end of the outer cylinder away from the deformable diaphragm and the inner wall surface of the housing, the gap communicates to reach a port of the outlet of the housing, drain holes penetrate through a side wall of the outer cylinder and are capable of communicating an inner cavity of the outer cylinder with the gap, an end of the inner cylinder facing the deformable diaphragm is closer to the deformable diaphragm than the drain hole is to the deformable diaphragm, the deformable diaphragm is capable of deforming and detaching from the protrusion under an effect of water pressure at the outlet holes and abutting on the end of the inner cylinder facing the deformable diaphragm.

* * * * *